July 28, 1942.   R. W. ANDREASSON   2,290,933
METHOD OF MANUFACTURING METAL CUTTING TOOLS
Filed Sept. 29, 1941
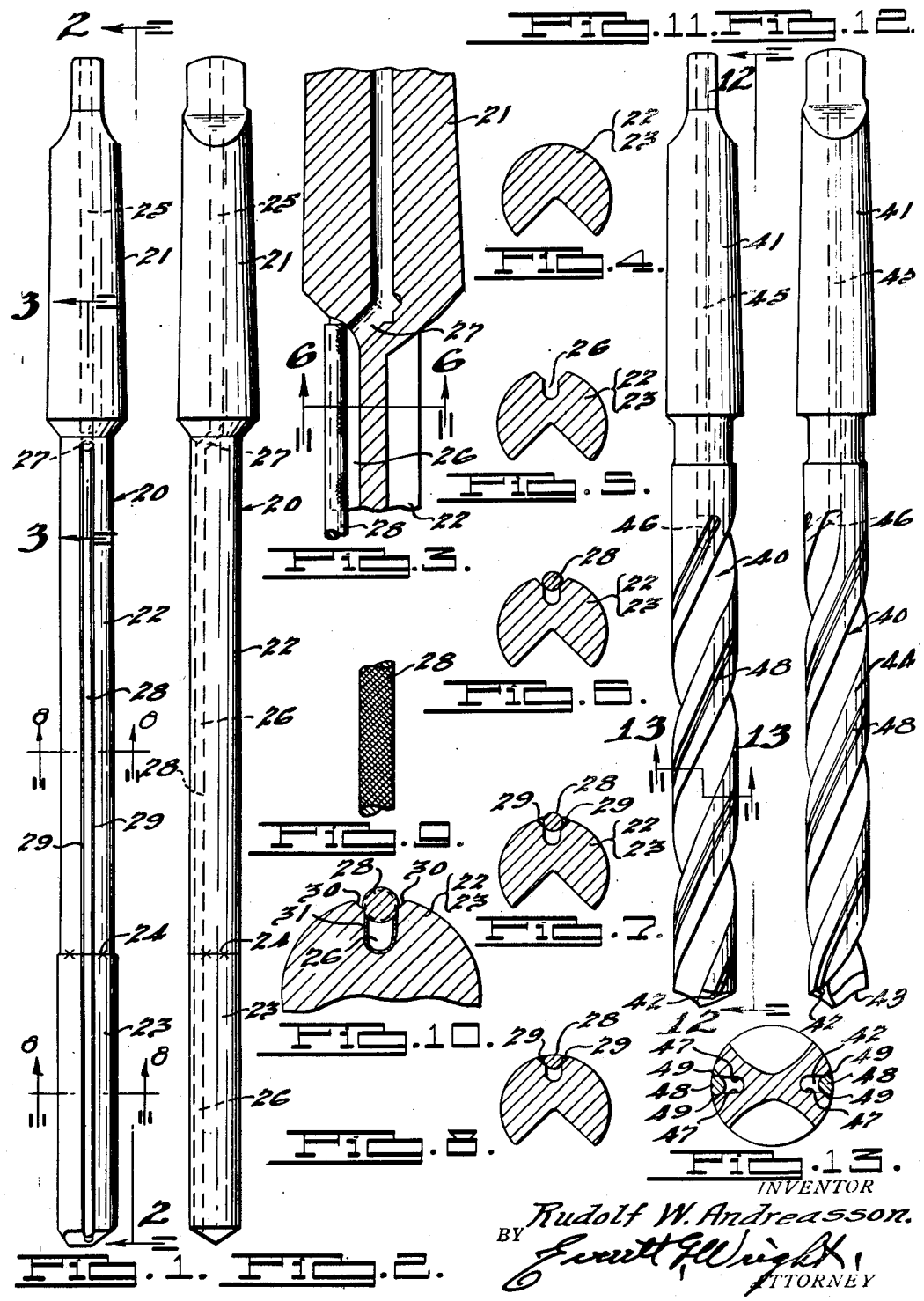
INVENTOR
Rudolf W. Andreasson.
BY
ATTORNEY Patented July 28, 1942

2,290,933

UNITED STATES PATENT OFFICE 2,290,933

METHOD OF MANUFACTURING METAL CUTTING TOOLS

Rudolf W. Andreasson, Detroit, Mich.

Application September 29, 1941, Serial No. 412,779

6 Claims. (Cl. 76—108)

This invention relates to metal cutting tools such as drills and the like and in particular to a method and means for providing a fluid passage therethrough and is an improvement over the invention disclosed and claimed in the co-pending application for patent of Rudolf W. Andreasson entitled Method of manufacturing metal cutting tools, Serial No. 411,650 filed September 20, 1941.

In gun drills and twist drills it is customary to provide a fluid passage longitudinally thereof through which cutting compound, lubricant and coolant is forced under pressure to the working end of the cutting tip. In other types of metal cutting tools fluid passages are provided for like purposes. Although the invention may be applied to various types of metal cutting tools having fluid passages therethrough, inasmuch as the invention is most applicable to gun drills and twist drills, it will be described with particular reference thereto.

In long gun drills and twist drills and particularly in small diameter gun drills and twist drills, it is extremely difficult and sometimes impossible to provide long longitudinal bores therethrough because the limited diameter of the stock available limits the diameter of the hole to be bored. Accordingly, long gun drills are oftentimes constructed of a solid shank drilled axially to communicate with a hollow shaft brazed or welded thereto, and onto the end of said shaft is brazed or welded a cutting tip axially bored to communicate with the hollow shaft, thus providing a continuous fluid passage from the top of the shank to the extreme end of the cutting tip. Heretofore, no fluid passage has been possible axially through twist drills of small diameters and long lengths because of lack of stock through which to drill or because of the impracticability of drilling long small diameter holes.

With the foregoing in view, the primary object of the invention is to provide a gun drill, twist drill or the like having an inexpensive and readily formed fluid passage from the top of the shank to the cutting tip thereof.

Another object of the invention is to provide an inexpensive and facile method for forming a fluid passage from the upper end of the shank to the cutting tip of long and small diameter gun and twist drills.

Another object of the invention is to provide a simple, effective and inexpensive method for providing a long or tortuous fluid passage through metal cutting tools and the like to the cutting tip or face thereof.

Other objects of the invention will become apparent by reference to the following detailed description taken in connection with the accompanying drawing, in which:

Fig. 1 is a side elevational view of a gun drill embodying the invention.

Fig. 2 is a side elevational view of the gun drill disclosed in Fig. 1 taken on the line 2—2 of Fig. 1.

Fig. 3 is an enlarged fragmentary longitudinal sectional view taken on the line 3—3 of Fig. 1 showing the gun drill bored, milled and prepared for brazing.

Fig. 4 is a cross sectional view of the shaft and cutting tip of the gun drill disclosed in Fig. 1 before milling.

Fig. 5 is a cross sectional view of the gun drill shaft and cutting tip having a longitudinal slot milled therein.

Fig. 6 is a cross sectional view of the gun drill shaft and cutting tip taken on the line 6—6 of Fig. 3 showing a bridge rod wedged in the top of the milled slot therein ready for brazing.

Fig. 7 is a cross sectional view of the gun drill shaft and cutting tip having the bridge rod securely brazed in place.

Fig. 8 is a cross sectional view taken on the lines 8—8 of Fig. 1 showing the completed gun drill shaft and cutting tip.

Fig. 9 is an enlarged fragmentary view of the preferably knurled bridge rod employed.

Fig. 10 is an enlarged fragmentary view showing how the knurled bridge rod is wedged into engagement with the drill at angular corners provided in the wall of the slot milled therein.

Fig. 11 is a side elevational view of a twist drill embodying the invention.

Fig. 12 is a side elevational view of the twist drill disclosed in Fig. 11 taken on the line 12—12 of Fig. 11.

Fig. 13 is an enlarged cross sectional view of the twist drill disclosed in Figs. 11 and 12 taken on the line 13—13 of Fig. 11.

Referring now to the drawing wherein like numerals refer to like and corresponding parts throughout the several views, the illustrative embodiment of the invention disclosed in Figs. 1–10 inclusive comprises a gun drill generally designated by the numeral 20 having a tapered shank 21, a solid V-shaped shaft 22 preferably integral with the said tapered shank 21, and a hardened steel V-shaped cutting tip 23 butt welded to the bottom of the said shaft 22 as indicated by the reference numeral 24 in Figs. 1 and 2.

The tapered shank 21 of the gun drill 20 is preferably provided with an axial bore 25 and the said shaft 22 and cutting tip 23 have a longitudinal slot 26 milled therein. A diagonal bore 27 provides a passage communicating between the axial bore 25 in the tapered shank 21 and the upper end of the slot 26 formed in the said shaft 22. The said slot 26 is preferably U-shaped in cross section at its base and V-shaped in cross section at the upper portion thereof as best indicated in Fig. 5 to receive a preferably knurled bridge rod or wire 28 as indicated in Fig. 6 and as shown more in detail in Figs. 9 and 10, the knurling of the bridge rod or wire 28 providing a roughened surface which facilitates wedging of the said bridge rod or wire 28 in the top of the slot 26 formed in the shaft 22 and cutting tip 23. The bridge rod or wire 28 may be otherwise deformed than knurling to permit it to be wedged readily into the top of the said slot 26 without severe peening which might force the bridge rod down too far into the slot 26. If the bridge rod or wire is of malleable steel or other malleable metal, it may be wedged into engagement in the U-shaped slot at the base of the upper V-shaped portion thereof without knurling the same.

The bridge rod 28 is secured in its wedged position in the top of the slot 26 by brazing on each side thereof as indicated by the numeral 29 in Fig. 7, the said bridge rod 28 serving as a form to prevent the filling of brass or the like 29 from running down into the bottom of the said slot 26. The foregoing construction provides a continuous fluid passage from the top of the shank 21 of the gun drill 20 to the working end of the cutting tip 23 thereof. The protruding portion of the bridge rod or wire 28 and any surplus filler or brazing material 29 is removed by such means as cutting, or grinding after which the surface of the drill is preferably polished.

Prior to placing the bridge rod or wire 28 in the slot 26 and as indicated in Fig. 10, the said slot 26 may be lined or painted with a compound 31 such as carbon and graphite or carbon and a silica binder or the like which serves as a form below any interstices that may occur between the bridge rod or wire 28 and the side walls of the said slot 26, thus preventing any brazing material 29 from running down into the bottom of the said slot 26 and blocking the completed fluid passage 32. Any compound 31 which adheres to the faces 30 of the slot 26 or which becomes smeared onto the upper exposed portion of the bridge rod or wire 28 is preferably buffed, scraped or wiped off therefrom before brazing.

Obviously, a wide range of shapes of the slot 26 and the bridge rod or wire 28 can be used in practicing the invention, and the bridge rod or wire 28 can be of sufficiently soft material to become wedged in a slot 26 without knurling or otherwise forming the said bridge rod or wire. However, inasmuch as it is desirous to have the face of the tool relatively hard, particularly at the cutting tip thereof, the knurling of a comparatively hard rod or wire permits the bridge rod or wire to be easily and readily peened into place prior to brazing without temporarily clamping the same in place prior to brazing. Furthermore, if a knurled or otherwise deformed bridge or wire 28 is employed the brazing will anchor itself thereto more readily. Likewise, it is contemplated that the surface 30 of the said slot 26 may be knurled or otherwise deformed to serve as an anchorage for brazing.

It will be noted that the bridge rod or wire 28 actually seats on the side walls of the slot 26, that very little of the brazing material 29 is exposed to denting by chips and the like during use, and that it is substantially impossible to force the bridge rod or wire 28 to the bottom of the slot 26 during use.

Figs. 11 to 13 inclusive show a twist drill 40 having a tapered shank 41 provided with a tortuous fluid passage 42 extending from the cutting tip 43 up the outside face of the twisted shaft 44 and communicating with an axial bore 45 to the tapered shank 41 by means of a diagonal bore 46. The said tortuous fluid passage 42 comprises a milled slot 47 having the top thereof flared and filled with a bridge rod or wire 48 brazed in place by suitable brazing 49 in a like and similar manner to the method hereinbefore described in connection with the gun drill and method of providing a longitudinal fluid passage therethrough shown in Figs. 1 to 10 inclusive.

By employing a bridge rod or wire 28 and 48 in the top of the slot 26 and 47 respectively much less brazing material 29 and 49 is required than if the top of the slot 26 and 47 were completely filled with brazing material thus cutting down the temperature to which the metal of the cutting tool is raised by the process of brazing thereby being assured that no deleterious annealing of the cutting portion of the metal cutting tool will occur during the providing of a longitudinal fluid passage therethrough in the manner hereinbefore described.

Although but two embodiments of the invention and a single method of practicing the invention have been disclosed and described in detail, it is obvious that many changes may be made in the size, shape, arrangement and detail of the elements of the invention and in the method of practicing the same without departing from the spirit of the invention as defined by the appended claims.

I claim:

1. The method of providing a fluid supply passage in cutting tools comprising the steps of milling a slot in said tool wider at the surface of the tool than at the base of said slot, disposing a bridge rod of larger diameter than the narrowest portion of said slot in the top of said slot, coating the said slot with a material serving as sealing means for interstices between said bridge rod and the sides of said slot prior to placing said bridge rod therein, wedging said bridge rod in said slot with the bottom thereof spaced from the bottom of said slot, removing said coating material from said bridge rod and the sides of said slot above the point of contact therebetween, filling the groove on each side of said bridge rod between said bridge rod and said tool above the point where the bridge rod contacts said tool with a material which will adhere to both the bridge rod and the tool, and then removing the portion of said bridge rod and filling material disposed above the surface of said tool.

2. The method of providing a fluid supply passage in cutting tools comprising the steps of milling a slot in said tool wider at the surface of the tool than at the base of said slot, disposing a bridge rod of larger diameter than the narrowest portion of said slot in the top of said slot, coating the said slot with a material serving as sealing means for interstices between said bridge rod and the sides of said slot prior to placing said bridge rod therein, wedging said bridge rod in said slot with the bottom thereof spaced from the bottom of said slot, removing said coating material from said bridge rod and the sides of said slot above the point of contact therebetween, brazing the said bridge rod to said tool by filling the groove on each side of said bridge rod between said bridge rod and said tool above the point where the bridge rod contacts said tool, and then removing the portion of said bridge rod and brazing material disposed above the surface of said tool.

3. The method of providing a fluid supply passage in cutting tools comprising the steps of milling a slot in said tool outwardly flared near the surface of the tool, disposing a bridge rod of larger diameter than the narrowest portion of said slot in the top of said slot, coating the said slot with a material serving as sealing means for interstices between said bridge rod and the sides of said slot prior to placing said bridge rod therein, wedging said bridge rod in said slot with the bottom thereof spaced from the bottom of said slot, removing said coating material from said bridge rod and the outwardly flared sides of said slot, filling the groove on each side of said bridge rod between said bridge rod and the flared sides of said slot with a material which will adhere to both the bridge rod and the tool, and then removing the portion of said bridge rod and filling material disposed above the surface of said tool.

4. The method of providing a fluid supply passage in cutting tools comprising the steps of milling a slot in said tool outwardly flared near the surface of the tool, disposing a bridge rod of larger diameter than the narrowest portion of said slot in the top of said slot, coating the said slot with a material serving as sealing means for interstices between said bridge rod and the sides of said slot prior to placing said bridge rod therein, wedging said bridge rod in said slot with the bottom thereof spaced from the bottom of said slot, removing said coating material from said bridge rod and the outwardly flared sides of said slot, brazing the said bridge rod to said tool by filling the groove on each side of said bridge rod between said bridge rod and the flared sides of said slot, and then removing the portion of said bridge rod and brazing material disposed above the surface of said tool.

5. The method of providing a fluid supply passage in cutting tools comprising the steps of milling a slot in said tool wider at the surface of the tool than at the base of said slot, disposing a knurled bridge rod of larger diameter than the narrowest portion of said slot in the top of said slot, coating the said slot with a material serving as sealing means for interstices between said knurled bridge rod and the sides of said slot prior to placing said bridge rod therein, wedging said knurled bridge rod in said slot with the bottom thereof spaced from the bottom of said slot, removing said coating material from said bridge rod and the sides of said slot above the point of contact therebetween, brazing the said knurled bridge rod to said tool by filling the groove on each side of said knurled bridge rod between said knurled bridge rod and said tool above the point where the knurled bridge rod contacts said tool, and then removing the portion of said knurled bridge rod and brazing material disposed above the surface of said tool.

6. The method of providing a fluid supply passage in cutting tools comprising the steps of milling a slot in said tool outwardly flared near the surface of the tool, disposing a knurled bridge rod of larger diameter than the narrowest portion of said slot in the top of said slot, coating the said slot with a material serving as sealing means for interstices between said knurled bridge rod and the sides of said slot prior to placing said bridge rod therein, wedging said knurled bridge rod in said slot with the bottom thereof spaced from the bottom of said slot, removing said coating material from said bridge rod and the outwardly flared sides of said slot, brazing the said knurled bridge rod to said tool by filling the groove on each side of said knurled bridge rod between said knurled bridge rod and the flared sides of said slot, and then removing the portion of said knurled bridge rod and brazing material disposed above the surface of said tool.

RUDOLF W. ANDREASSON.